(12) United States Patent
Mueller et al.

(10) Patent No.: US 10,207,689 B2
(45) Date of Patent: Feb. 19, 2019

(54) METHOD FOR CONTROLLING A BRAKE SYSTEM

(71) Applicant: Deere & Company, Moline, IL (US)

(72) Inventors: David Mueller, Stutensee (DE); Marco Reinards, Gruenstadt (DE)

(73) Assignee: Deere & Company, Moline, IL (US)

( * ) Notice: Subject to any disclaimer, the term of this patent is extended or adjusted under 35 U.S.C. 154(b) by 281 days.

(21) Appl. No.: 15/162,797

(22) Filed: May 24, 2016

(65) Prior Publication Data

US 2016/0347296 A1     Dec. 1, 2016

(30) Foreign Application Priority Data

May 28, 2015   (DE) ........................ 10 2015 209 774

(51) Int. Cl.
| | |
|---|---|
| *B60T 8/32* | (2006.01) |
| *B60T 10/04* | (2006.01) |
| *B60T 13/58* | (2006.01) |
| *B60T 13/66* | (2006.01) |
| *A01B 76/00* | (2006.01) |

(52) U.S. Cl.
CPC ............ *B60T 8/3215* (2013.01); *A01B 76/00* (2013.01); *B60T 10/04* (2013.01); *B60T 13/585* (2013.01); *B60T 13/662* (2013.01)

(58) Field of Classification Search
CPC ...... B60T 8/3215; B60T 10/04; B60T 13/662; B60T 13/585; A01B 76/00
See application file for complete search history.

(56) References Cited

U.S. PATENT DOCUMENTS

2008/0167161 A1*   7/2008   Mitchell ................ B60W 10/11
                                                                             477/94

FOREIGN PATENT DOCUMENTS

| | | |
|---|---|---|
| DE | 69302573 T2 | 9/1996 |
| DE | 19741510 A1 | 5/1998 |
| DE | 19706451 A1 | 8/1998 |
| DE | 19822859 A1 | 7/1999 |
| EP | 1860008 A2 | 11/2007 |
| JP | 2011 219015 A | 11/2011 |
| WO | 2004/048172 A1 | 6/2004 |
| WO | 2007/139489 A1 | 12/2007 |

OTHER PUBLICATIONS

Machine Translation of JP2011-219015, retrieved from Espacenet. com on Apr. 16, 2018.*
German Search Report issued in counterpart application No. DE102015209774.9, dated Feb. 23, 2016 (10 pages).
EP Search Report issued in counterpart application No. EP16169706. 5, dated Oct. 5, 2016 (7 pages).

\* cited by examiner

*Primary Examiner* — Thomas Ingram

(57) ABSTRACT

A method for controlling a brake system in an agricultural work vehicle, wherein the work vehicle comprises a drive train having a drive engine, an adjustable ratio transmission, which is arranged downstream of the drive engine and via which a driving power generated by the internal combustion engine can be transmitted to the drive axle, a service brake device and at least one auxiliary brake device.

4 Claims, 2 Drawing Sheets

METHOD FOR CONTROLLING A BRAKE SYSTEM

RELATED APPLICATION

This application claims priority to German Application Serial Number DE102015209774.9 filed on May 28, 2015, which is hereby expressly incorporated by reference in its entirety.

FIELD OF THE DISCLOSURE

The invention relates to a method for controlling a brake system in an agricultural work vehicle, wherein the work vehicle comprises a drive train having a drive engine, an adjustable ratio transmission, which is arranged downstream of the drive engine and via which a driving power generated by the internal combustion engine can be transmitted to the drive axle, a service brake device and at least one auxiliary brake device.

BACKGROUND

The service brake device of an agricultural work vehicle is fundamentally subject to wear. The service brake device is ordinarily designed as a hydraulically actuated and oil-cooled disk brake, the lamellar friction liners of which are arranged inside the transmission or differential housing. In this way oil cooling is accomplished by means of the transmission fluid, which can itself be part of the hydraulic circulation system. The disadvantage of this service brake device integrated into the transmission or differential housing is the maintenance challenge in the event that the friction linings have to be replaced. It can be that this can only be done by removing the transmission or the differential.

To reduce downtime of agricultural work vehicles caused by repair and maintenance, it is necessary to relieve or replace maintenance-intensive components such as service brake devices with components that are at least low-maintenance. Relief would at least have the advantage of lengthening the maintenance interval of maintenance-intensive components.

Auxiliary brake devices can operate according to a variety of physical principles. In this regard one could mention a variable turbine geometry in an exhaust gas turbocharger, a hydrostatic retarder, an eddy-current brake, an exhaust brake, a hydraulic system brake or an electrical drive axle operated in generator mode. The additional availability of an auxiliary brake device can significantly lengthen the lifetime or the maintenance interval of the service brake device in the agricultural work vehicle, since the use of the service brake is reduced, with regard to both duration and frequency, particularly in the wear-promoting transport speed range.

SUMMARY

An aspect of the present invention provides the use of a service brake device and at least one auxiliary brake device in such a manner that the lifetime of the service brake device may be increased.

An aspect provides for controlling a brake system in an agricultural work vehicle, wherein the work vehicle comprises a drive train having a drive engine, an adjustable ratio transmission, which is arranged downstream of the drive engine and via which a driving power generated by the internal combustion engine can be transmitted to the drive axle, a service brake device, at least one auxiliary brake device and an actuating device, by means of which a deceleration value $a_{soll}$ of the work vehicle that characterizes a braking deceleration of the work vehicle can be commanded to the service brake device and the at least one auxiliary brake device, wherein the at least one auxiliary braking device is activated by the at least one actuating device with priority relative to the service brake device so long as the deceleration value $a_{aux}$ provided by the auxiliary brake device is able to cover the commanded deceleration value $a_{soll}$, and the service brake device is activated only if the commanded deceleration value $a_{soll}$ exceeds the deceleration value $a_{aux}$ that can be achieved by the at least one auxiliary brake device.

The method according to the invention provides an integrated regulation of the service brake device and the at least one auxiliary brake device in order to achieve an efficient application of the compound system. The method according to the invention additionally provides a modularly constructed approach for regulating at least one auxiliary brake system with a variable degree of complexity, including the implementation in an overall vehicle controller.

The actuating device may include an operating means that can be activated by an operator of the work vehicle. The operating means in the simplest configuration are designed as an additionally installed operating lever, e.g., a separate auxiliary brake lever or as an activation/deactivation switch for an auxiliary brake system. In another configuration, the operating means are formed by existing operating elements of the work vehicle such as a brake pedal or a drive lever.

The at least one auxiliary brake system can apply its braking power to a crankshaft of the drive engine. This help the braking power to be transmitted in any case via the drive engine and the downstream transmission to the drive wheels of the work vehicle.

A transmission ratio of the transmission can be adjusted in the direction of a higher transmission ratio, at least while one of the auxiliary brake systems is being activated with priority. A higher transmission ratio is understood to mean in this context that, for a constant speed or rotational speed of the drive wheels, there is a higher rotational speed of the drive engine.

The work vehicle can comprise an electronic control device, wherein the electronic control device activates the at least one auxiliary brake system if a rotational speed limit of the drive engine is exceeded and a torque of the drive engine falls below a torque limit at the same time. This can constitute an overload speed protection of the drive engine in a simple manner.

BRIEF DESCRIPTION OF THE DRAWINGS

The method according to the invention will be described with reference to the following figures. Wherein.

DETAILED DESCRIPTION

Figure 1:
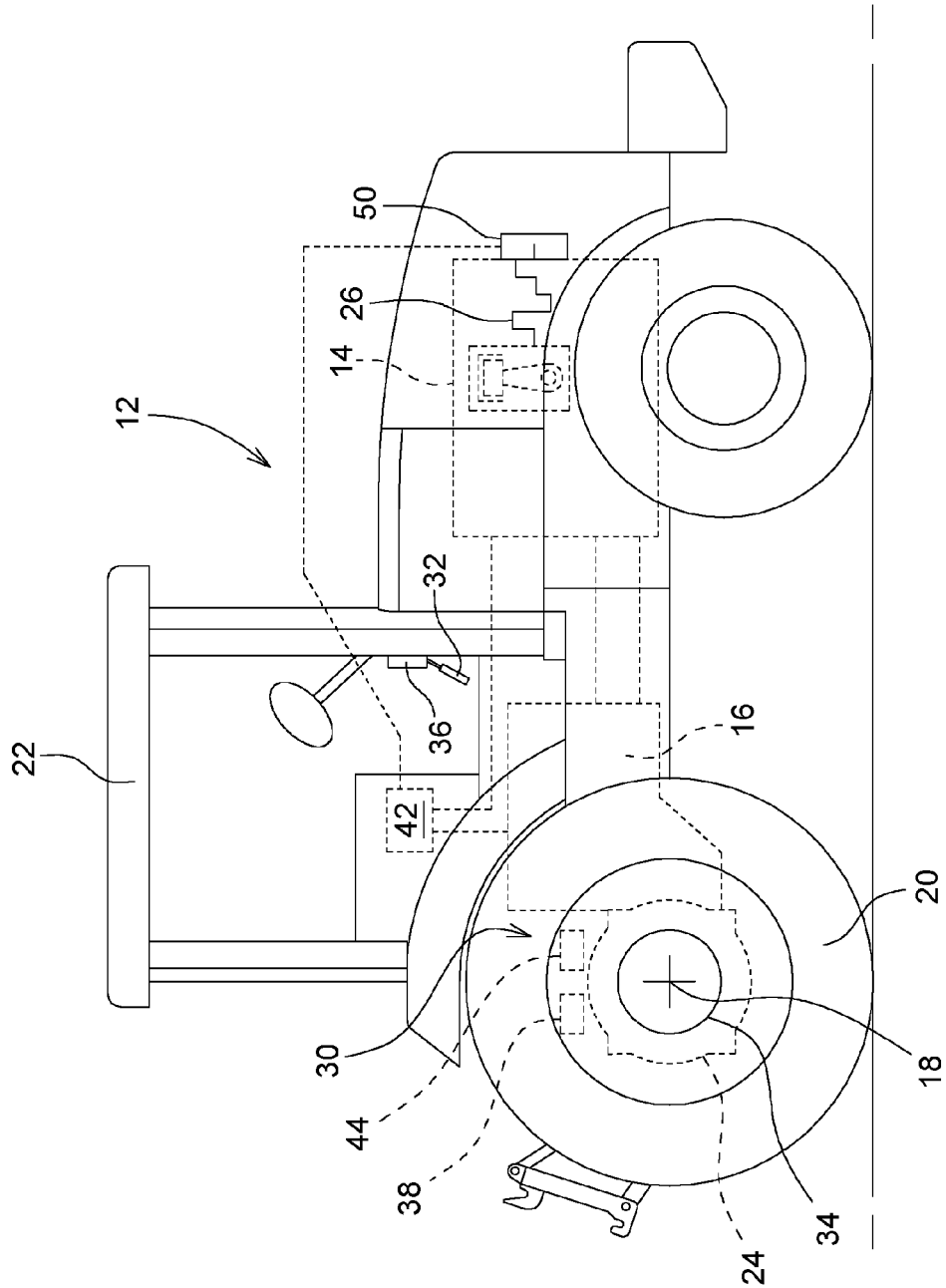
FIG. 1 shows an agricultural work vehicle.

FIG. 1 shows an agricultural work vehicle 10 in the form of a tractor. The work vehicle 10 comprises a drive train 12 consisting of a drive engine 14, a transmission 16 with an adjustable transmission ratio and a drive axle 18 having drive wheels 20. The transmission can be a continuously variable transmission, a parallel-shift transmission, an epicyclic gear transmission or a semi-automatic transmission. The work vehicle 10 further comprises a service brake device 30, which comprises an actuating device 32, in the form of a brake pedal for example, arranged in a cab 22 within reach of an operator present there, and a brake unit 34 for applying a braking torque to the drive axle 18, which transmits the braking torque upon actuation to the ground surface currently being driven on. The actuating device 32 can additionally or alternatively comprise a drive lever or a manual throttle lever. The brake unit 34 can be implemented as a wet disk brake, for example. The brake unit 34 can additionally be arranged in a differential housing 24 and thus act on the drive axle 18.

The service brake device 30 can be actuated in the conventional manner, in that the operator actuates the actuating device 32 in the form of a brake pedal and hydraulic fluid is provided by a hydraulic pump of the work vehicle 10 at a braking pressure to the brake unit 34. The position of the brake pedal 32 assumed upon actuation of the service brake device 30 can be detected with a position sensor 36, the generated braking pressure with a pressure sensor 38 and the generated braking deceleration of the work vehicle 10 with an acceleration sensor 40. In addition, an electronic control unit 42, which is connected for data exchange and control purposes to the drive engine 14, the transmission device 16, the service brake device 30 and the sensors 36, 38, 40, is also provided.

The electronic control unit 42 can comprise one or more microcontrollers $42_1$, $42_2$, wherein at least one microcontroller calculates, from the values position of the brake pedal 32, generated brake pressure and generated braking deceleration of the work vehicle 10, a deceleration value $a_{soll}$ that characterizes a braking deceleration of the work vehicle 10.

FIG. 1 additionally shows that the work vehicle 10 comprises an auxiliary brake device 50 that, in a first embodiment of the work vehicle 10, is designed as a retarder, to which the method of the invention for controlling a brake system is applicable. The retarder can operate according to a hydrostatic functional principle and can be arranged in a front region on the drive engine 14 and driven by a crankshaft 26 of the drive engine 14. The auxiliary brake device 50 can be actuated by operating means arranged separately in the cab 22, which are not illustrated in the present case, however. Alternatively, the auxiliary brake device 50 can be actuated by the actuating device 32 already described in relation to the service brake device 30.

Figure 2:
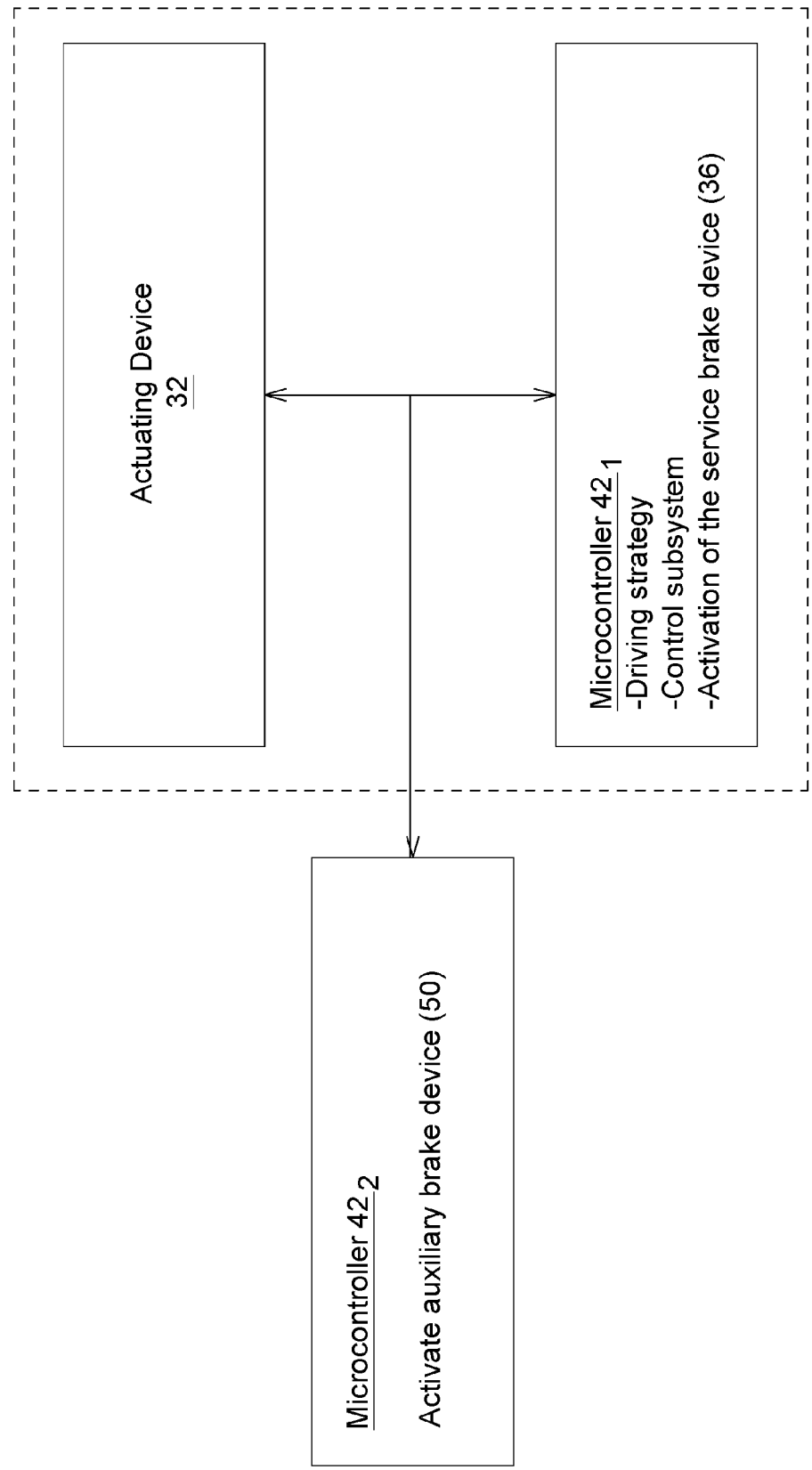
FIG. 2 shows a block diagram of components for performing the method according to the invention.

FIG. 2 schematically shows, in a block diagram, the interaction of individual components necessary for performing the method according to the invention. The actuating device 32, by means of which a braking deceleration of the work vehicle 10 can be commanded, is listed first. The actuating device 32 has a control connection to the microcontroller $42_1$, which is part of the electronic control unit 42. Driving strategies, which include stored transmission shifting strategies, for example, are stored on the microcontroller $42_1$. The microcontroller $42_1$ takes on the control of subsystems such as the activation of a front-wheel drive that can be switched on as needed, or the activation of the transmission 16 based on a shifting strategy. A microcontroller $42_2$ is connected for control purposes to the actuating device 32 and the microcontroller $42_1$. The microcontroller $42_2$ is used for controlling the auxiliary brake device 50. The method according to the invention has the effect, depending on the availability and the respective driving state, of initially executing the braking deceleration commanded by the operator by using the auxiliary brake device 50, until the braking deceleration $a_{aux}$ that can be achieved with the auxiliary brake device 50 is below a value $a_{soll}$ of the braking deceleration. The auxiliary brake device 50 is controlled by the microcontroller $42_2$. If the commanded braking deceleration $a_{soll}$ cannot be provided or cannot be provided completely by the auxiliary brake device 50, the microcontroller $42_1$ activates the service brake device 30.

The method according to the invention can additionally extend to adjusting the transmission 16 in the direction of a larger transmission ratio by means of a transmission ratio lever, where the transmission ratio lever can be comprised by the actuating device 32. Additional braking power is provided by the auxiliary brake system 50 due to the adjusted higher transmission ratio of the transmission 16. For this purpose, the relevant transmission variables such as engine speed or current transmission ratio and additional conditions are checked by the microcontroller $42_1$.

The method according to the invention can also be used for an engine speed regulation of the drive engine 14. In this case the auxiliary brake device 50 is operated in overrun mode. This allows an over-rotation protection by automatically activating the auxiliary brake device 50 when an engine rotational speed limit is exceeded with simultaneous undershooting of a torque limit.

By activating the auxiliary brake 50 during a warm-up phase of the drive engine 14, faster heating of the drive engine 14 and a hydraulic system of the work vehicle 10 can be achieved, since an artificial load is produced by the auxiliary brake device 50.

A hydrostatic retarder was described in connection with FIG. 1 as a possible embodiment of the auxiliary brake device 50. Either alternative systems or additional systems in parallel can be used. These include a variable turbine geometry of an exhaust gas turbocharger, an eddy current brake, an exhaust brake, a hydraulic system brake, a combination of a generator, an inverter and a brake resistor, or an electrical drive axle operated in generator mode in a towed implement. The auxiliary brake device 50 can also be arranged on the work vehicle 10 itself or on an attached implement. Each of said auxiliary brake devices can be used both autonomously and as a single or multiple combination with other auxiliary brake devices. In principle, any connectible power consumer that exerts a load on the drive engine can be used as an auxiliary brake device. The load can be connected via an electrical path, a mechanical path or a hydraulic path. All auxiliary brake devices at least indirectly draw their braking power from the crankshaft of the drive engine.

The invention claimed is:

1. A method for controlling a brake system in an agricultural work vehicle, the work vehicle including a drive train having a drive engine, a variable transmission ratio transmission which is arranged downstream of the drive engine and via which the drive power generated by the drive engine can be transmitted to a drive axle, a service brake device, and an auxiliary brake device, the method comprising:
   an actuating device receiving a command to decelerate the work vehicle;
   commanding a deceleration value ($a_{soll}$) to the service brake device and auxiliary brake device; and
   adjusting a transmission ratio of the transmission towards a larger transmission ratio when the auxiliary brake device is being actuated with priority;
   wherein the actuating device activates the auxiliary brake device with priority relative to the service brake device so long as the deceleration value ($a_{aux}$) provided by the auxiliary brake device is able to cover the commanded deceleration value ($a_{soll}$), and the service brake device is activated only if the commanded deceleration value ($a_{soll}$), exceeds the deceleration value ($a_{aux}$) that can be achieved by the auxiliary brake device; and wherein the auxiliary brake device applies the braking power thereof to a crankshaft of the engine.

2. The method of claim 1, wherein the actuating device is configured to be activated by an operator of the agricultural vehicle.

3. The method of claim 2, wherein the actuating device is a brake pedal or a drive lever of the work vehicle.

4. The method of claim 1, wherein the work vehicle comprises an electronic control unit and the method further comprises the electronic control unit activating the auxiliary brake device when a speed limit of the drive engine is exceeded and a torque limit of the drive engine is undershot.

* * * * *